United States Patent
Seibert, Jr. et al.

(10) Patent No.: US 9,841,969 B2
(45) Date of Patent: Dec. 12, 2017

(54) SOFTWARE DEVELOPMENT AND DISTRIBUTION PLATFORM

(71) Applicant: Google Inc., Mountain View, CA (US)

(72) Inventors: Jeffrey H. Seibert, Jr., San Francisco, CA (US); Wayne Chang, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/256,058

(22) Filed: Sep. 2, 2016

(65) Prior Publication Data
US 2017/0060568 A1 Mar. 2, 2017

Related U.S. Application Data

(60) Provisional application No. 62/213,481, filed on Sep. 2, 2015.

(51) Int. Cl.
*G06F 9/44* (2006.01)
*G06F 9/445* (2006.01)
*G06F 11/36* (2006.01)

(52) U.S. Cl.
CPC .......... *G06F 8/65* (2013.01); *G06F 8/71* (2013.01); *G06F 8/30* (2013.01); *G06F 8/60* (2013.01); *G06F 8/61* (2013.01); *G06F 8/63* (2013.01); *G06F 8/68* (2013.01); *G06F 11/3664* (2013.01)

(58) Field of Classification Search
CPC ..... G06F 8/30; G06F 8/60; G06F 8/61; G06F 8/63; G06F 8/65; G06F 8/68; G06F 8/71; G06F 11/3664; G06Q 30/0201
USPC .......................................... 717/124, 168–178
See application file for complete search history.

(56) References Cited

U.S. PATENT DOCUMENTS

| | | | | |
|---|---|---|---|---|
| 6,009,274 A | * | 12/1999 | Fletcher | G06F 8/65 709/217 |
| 7,672,875 B2 | * | 3/2010 | Keohane | G06Q 20/387 705/26.62 |
| 7,676,792 B2 | * | 3/2010 | Irie | G06F 8/36 717/121 |
| 8,261,231 B1 | * | 9/2012 | Hirsch | G06F 8/20 709/201 |

(Continued)

OTHER PUBLICATIONS

Wang, N., "50 Mobile App Development Tips for Acquisition, Retention, and Everything in Between," Aug. 31, 2015, last retrieved from https://blog.optimizely.com/2015/08/31/mobile-app-development/ on Sep. 29, 2017.*

(Continued)

*Primary Examiner* — Wei Zhen
*Assistant Examiner* — Andrew M Lyons
(74) *Attorney, Agent, or Firm* — Fish & Richardson P.C.

(57) ABSTRACT

A system and method for developing and distributing software. Third-party software development kits (SDKs) are received and stored by a software development and distribution platform (SDDP), with each third-party SDK published by a third-party service provider, the plurality of third-party SDKs including a first third-party SDK. An installation request from an application developer machine is received by the SDDP and the SDDP sends the first third-party SDK in response to the installation request for installation in an application under development.

19 Claims, 7 Drawing Sheets

(56) References Cited

U.S. PATENT DOCUMENTS

| | | | |
|---|---|---|---|
| 8,413,259 B2* | 4/2013 | DeHaan | G06F 21/57 726/29 |
| 8,438,562 B2* | 5/2013 | Sero | G06F 8/61 717/168 |
| 8,566,891 B2* | 10/2013 | McKelvey | H04N 7/173 348/180 |
| 8,719,776 B2* | 5/2014 | Eteminan | G06F 8/20 717/106 |
| 8,739,249 B1* | 5/2014 | Kay | G06F 21/00 709/217 |
| 2004/0034850 A1* | 2/2004 | Burkhardt | G06F 8/65 717/120 |
| 2004/0141386 A1* | 7/2004 | Karlsson | G06F 17/5054 365/200 |
| 2004/0230872 A1* | 11/2004 | Mullally | G06F 11/008 714/38.14 |
| 2005/0229174 A1* | 10/2005 | Westendorf | G06F 8/61 717/175 |
| 2005/0245249 A1* | 11/2005 | Wierman | G06F 8/61 455/419 |
| 2006/0037001 A1* | 2/2006 | Irie | G06F 8/36 717/120 |
| 2006/0242638 A1* | 10/2006 | Lew | G06F 9/4443 717/168 |
| 2006/0265702 A1* | 11/2006 | Isaacson | G06F 8/61 717/168 |
| 2007/0157176 A1 | 7/2007 | Donaldson | |
| 2007/0233782 A1 | 10/2007 | Tali | |
| 2008/0005287 A1 | 1/2008 | Harvey et al. | |
| 2008/0027825 A1* | 1/2008 | Boonie | G06F 9/5011 705/26.8 |
| 2008/0071885 A1* | 3/2008 | Hardy | H04L 41/22 709/219 |
| 2008/0127037 A1* | 5/2008 | Kadur | G06F 8/20 717/100 |
| 2008/0163199 A1* | 7/2008 | Rao | G06F 8/61 717/177 |
| 2008/0301669 A1 | 12/2008 | Rao et al. | |
| 2009/0006883 A1* | 1/2009 | Zhang | G06F 11/366 714/1 |
| 2009/0106698 A1* | 4/2009 | Hansen | G06F 17/30905 715/838 |
| 2009/0144728 A1* | 6/2009 | Felts | G06F 8/60 717/175 |
| 2009/0171484 A1* | 7/2009 | Birze | G05B 19/042 700/86 |
| 2009/0282402 A1* | 11/2009 | Allocca | G06F 8/61 717/176 |
| 2009/0320017 A1* | 12/2009 | Jackson | G06F 8/61 717/174 |
| 2010/0037204 A1* | 2/2010 | Lin | G06F 8/20 717/106 |
| 2010/0242033 A1* | 9/2010 | Fritsch | G06F 8/65 717/171 |
| 2010/0287529 A1* | 11/2010 | Costa | G06F 8/34 717/105 |
| 2011/0029359 A1* | 2/2011 | Roeding | G06Q 30/00 705/14.1 |
| 2011/0040808 A1* | 2/2011 | Joy | G06F 8/20 707/812 |
| 2011/0044354 A1* | 2/2011 | Wei | H04L 41/0816 370/468 |
| 2011/0154313 A1* | 6/2011 | Nolterieke | G06F 8/68 717/170 |
| 2011/0161912 A1* | 6/2011 | Eteminan | G06F 8/20 717/101 |
| 2011/0209008 A1* | 8/2011 | Arapov | G06F 11/0748 714/48 |
| 2011/0231280 A1* | 9/2011 | Farah | G06Q 10/10 705/26.8 |
| 2011/0271272 A1 | 11/2011 | Chow et al. | |
| 2011/0314438 A1* | 12/2011 | Surazski | G06F 11/0742 717/100 |
| 2012/0116905 A1* | 5/2012 | Futty | G06F 17/30867 705/26.1 |
| 2012/0144378 A1* | 6/2012 | Shah | G06F 8/60 717/170 |
| 2012/0204171 A1* | 8/2012 | Reisman | G06F 8/65 717/172 |
| 2012/0244948 A1* | 9/2012 | Dhillon | G06Q 30/0209 463/42 |
| 2012/0260232 A1* | 10/2012 | Hirsch | G06F 8/20 717/107 |
| 2012/0291022 A1* | 11/2012 | Mehta | G06F 8/60 717/176 |
| 2012/0303477 A1* | 11/2012 | Ben-Itzhak | G06Q 30/02 705/26.7 |
| 2012/0331460 A1* | 12/2012 | Manahan | H04L 67/34 717/178 |
| 2013/0055247 A1* | 2/2013 | Hiltgen | G06F 8/60 718/1 |
| 2013/0073614 A1 | 3/2013 | Shine et al. | |
| 2013/0159996 A1* | 6/2013 | Lin | G06F 8/60 717/178 |
| 2013/0205277 A1* | 8/2013 | Seven | G06F 8/38 717/121 |
| 2013/0225124 A1* | 8/2013 | Yan | H04L 67/34 455/406 |
| 2014/0007052 A1* | 1/2014 | Amrhein | G06F 8/71 717/121 |
| 2014/0040017 A1* | 2/2014 | Bafna | G06Q 30/0246 705/14.45 |
| 2014/0053126 A1* | 2/2014 | Watson | G06F 8/30 717/102 |
| 2014/0109073 A1 | 4/2014 | Fawcett | |
| 2014/0123157 A1* | 5/2014 | Keskitalo | G06Q 10/107 719/328 |
| 2014/0141768 A1* | 5/2014 | Javaid | H04W 4/001 455/423 |
| 2014/0172557 A1 | 6/2014 | Eden et al. | |
| 2014/0194146 A1* | 7/2014 | Yarvis | G06Q 10/00 455/456.3 |
| 2014/0207912 A1* | 7/2014 | Thibeault | H04L 67/2847 709/219 |
| 2014/0229821 A1 | 8/2014 | Abrahami | |
| 2014/0258970 A1* | 9/2014 | Brown | G06F 8/47 717/103 |
| 2014/0365311 A1 | 12/2014 | Eulenstein et al. | |
| 2014/0372963 A1* | 12/2014 | Chandaria | G06F 8/00 717/100 |
| 2015/0172060 A1* | 6/2015 | Mahaffey | G06F 8/70 713/176 |
| 2015/0186123 A1* | 7/2015 | Piunno | G06F 8/54 717/163 |
| 2016/0180647 A1* | 6/2016 | Webb | G07F 17/3258 463/27 |

OTHER PUBLICATIONS

Xamarin, "Using the Xamarin Android SDK Manager," originally published Apr. 15, 2015, last updated 2017, last retrieved from https://developer.xamarin.com/guides/android/application_fundamentals/using-the-sdk-manager/ on Sep. 29, 2017.*

U.S. Appl. No. 15/250,753, by Wayne Chang, filed Aug. 29, 2016.

International Search Report and Written Opinion No. PCT/US16/50240, dated Nov. 15, 2016, 14 pages.

International Preliminary Report on Patentability issued in International Application No. PCT/US2016/050240, dated on Sep. 16, 2017, 12 pages.

* cited by examiner

SOFTWARE DEVELOPMENT AND DISTRIBUTION PLATFORM

This application claims the benefit of U.S. Provisional Application No. 62/213,481, filed Sep. 2, 2015, the entire contents of which are incorporated herein by reference.

BACKGROUND

Application developers are using an increasing number of third-party services to provide additional features and capabilities in their applications, including mobile applications executable on smart phones, tablets, cameras, Internet of Things ("Iot") devices, as well as other networked devices. An application developer, for example, may download software development kits ("SDK") from disparate sources into an integrated development environment ("IDE") to incorporate functionality into an application being built. Such an approach removes the need to re-create the wheel since the developer need not start from scratch to implement into the application's source code the functions or function calls she wants the application to have. Such an approach simplifies and speeds up application development and simplifies migration of applications to different platforms.

SUMMARY

In general, in one aspect of the invention, a software development and distribution platform ("SDDP") provides a list of features, functions, or other computing resources that are selectable in an IDE to build dynamically and in real-time a customized and downloadable SDK that incorporates code necessary to implement the selected computing resources into an application being built in the IDE. Advantageously, the computing resources proffered to a developer working in the IDE are highly modular, and the customized SDK imposes a computing memory load that is significantly less than the memory load that would be imposed on the IDE if the developer were to download separate SDKs for each of the selected computing resources. Moreover, the SDDP provide SDK management functions. For example, the SDDP tracks updates to third party SDKs and, when appropriate and not needing manual queries from the developer, notifies the developer that the application needs updating. Advantageously, the developer is liberated from the administrative burden of having to monitor for updates the various resources of SDKs used to build the application. Another management function includes providing a market place for developers and third parties to provide and use SDKs, which advantageously provides a one stop shop for developers and SDKs providers alike.

In one example, a system and method of designing applications includes storing a plurality of third-party software development kits (SDKs) on a software development and distribution platform (SDDP), each third-party SDK published by a third-party service provider and each third-party SDK accessing one or more services provided by the third-party service provider; receiving a request from an application developer for a third-party SDK, the request including an SDK type; searching the SDDP for third-party SDKs that match the SDK type; and transmitting a response indicating one or more third-party SDKs that match the SDK type.

In another example, a method of operating a software development and distribution platform (SDDP) includes receiving, by the SDDP, a plurality of third-party software development kits (SDKs), each third-party SDK published by a third-party service provider, the plurality of third-party SDKs including a first third-party SDK; storing, by the SDDP, the plurality of third-party SDKs; receiving, by the SDDP and from an application developer machine, an installation request for the first third-party SDK; and sending, by the SDDP and in response to the installation request, the first third-party SDK for installation in an application under development.

In another example, a software development and distribution platform (SDDP) includes a software development kit (SDK) repository storing a plurality of third-party SDKs, each SDK published by a third-party service provider; at least one processor; and a computer-readable storage medium storing instructions that, when executed, cause the at least one processor to generate an SDK profile for each third-party SDK; receive a recommendation request for a third-party SDK to be installed in an application under development on an application developer machine; and generate, based on the plurality of SDK profiles and the recommendation request, a recommendation identifying a third-party SDK for installation in the application under development.

In another example, a system includes an integrated development environment (IDE) storing code for an application under development, wherein the application under development includes a first third-party software developer kit (SDK); at least one processor; and a computer-readable storage medium storing instructions that, when executed, cause the at least one processor to send, to a software development and distribution platform (SDDP), a recommendation request comprising a type of third-party software development kit (SDK) and a target operating system of the application under development; receive, from the SDDP, a recommendation identifying a second third-party SDK; send, to the SDDP, an installation request for the recommended third-party SDK; receive, from the SDDP, the second third-party SDK; and modify the code to include the second third-party SDK.

In another example, a software development and distribution platform (SDDP) includes at least one processor; and a computer-readable storage medium storing instructions that, when executed, cause the at least one processor to receive a plurality of third-party software development kits (SDKs), each third-party SDK published by a third-party service provider, the plurality of third-party SDKs including a first third-party SDK; store the plurality of third-party SDKs; receive, from an application developer machine, an installation request for the first third-party SDK; and send, in response to the installation request, the first third-party SDK for installation in an application under development.

In yet another example, a computer-readable storage medium stores instructions that, when executed by at least one processor in a software development and distribution platform (SDDP), cause the at least one processor to receive a plurality of third-party software development kits (SDKs), each third-party SDK published by a third-party service provider, the plurality of third-party SDKs including a first third-party SDK; store the plurality of third-party SDKs; receive, from an application developer machine, an installation request for the first third-party SDK; and send, in response to the installation request, the first third-party SDK for installation in an application under development.

The software development and distribution platform (SDDP) described provides a mechanism for simplifying the addition of services to applications under development. Third-party SDKs are stored in the SDDP, where each third-party SDK published by a third-party service provider and where each third-party SDK accessing one or more services provided by the third-party service provider who published the SDK. The SDDP receives a request from an application developer for a third-party SDK, the request including an SDK type, searches the SDDP for third-party SDKs that match the SDK type and transmits a response indicating one or more third-party SDKs that match the SDK type. In some examples, an SDDP plugin is installed into an integrated design environment in an application development machine to simplify the addition of SDKs to the application under development. In some examples, the SDDP recommends an SDK based on parameters transferred with the SDK request, and the application developer installs the recommended SDK by selecting the recommended SDK. The result is an elegant, modular design system which can easily add and update services to applications under development and to deployed applications.

The system and method may become even more powerful when SDKs are examined and approved before being accepted into the SDDP. Application developers do not necessarily have to independently investigate possible service providers and their SDKs. Instead, they can rely on the trusted SDKs in the SDDP.

The details of one or more examples of the disclosure are set forth in the accompanying drawings and the description below. Other features, objects, and advantages of the disclosure will be apparent from the description and drawings, and from the claims.

DETAILED DESCRIPTION

Specific aspects of the invention will now be described in detail with reference to the accompanying figures. Like elements in the various figures are denoted by like reference numerals for consistency.

In the following detailed description, numerous specific details are set forth in order to provide a more thorough understanding of the disclosure. However, it will be apparent to one of ordinary skill in the art that the invention may be practiced without these specific details. In other instances, well-known features have not been described in detail to avoid unnecessarily complicating the description.

Third-party service providers increasingly provide software that can be inserted into applications under development in order to provide access to the service provider's service or services. Such an approach simplifies and speeds up application development and simplifies migration of applications to different platforms. In one example approach, SDKs are modular in nature, providing a limited number of services. This is because it may not be efficient to place a large number of services into a single SDK. The single SDK may, for example, become bloated, applications may take on services they do not need, and the applications may become slow and burdensome to download.

It can often be difficult to determine the best SDK to use for a particular service. Application developers may have to review many SDKs offering the same or similar services before determining the SDK most appropriate for their application. And it may be difficult to track changes and updates to the SDK code and to determine the efficacy of the underlying service.

To address these needs, a software development and distribution platform (SDDP) is described herein that receives SDKs and makes them available to application developers. In one example approach, the SDDP provides a central platform through which application developers can access a wide variety of SDKs from multiple third-party service providers. Third-party service providers publish their SDKs to the SDDP for download by a wide range of application developers, including developers of mobile applications. In one example approach, the SDDP provides a standardized interface for SDKs; the SDKs are modular and designed to plugin to a base library of the SDDP.

In one example approach, the SDDP operates as an intermediary between third-party service providers that develop third-party SDKs and mobile application developers. In other words, the SDDP links a third-party service provider, which publishes one or more third-party SDKs, to application developers that download the third-party SDKs for installation in their mobile applications. The SDDP also links the application developers to the end users and to the mobile devices of the end users on which the applications are deployed and executing. The SDDP may collect metrics and feedback messages to generate profiles for SDKs, applications, and end-users. The SDDP may generate notifications and other messages based on the metrics and feedback messages and may coordinate communication between the application developers, the third-party service providers and the end-users. The SDDP may also generate recommendations identifying one or more third-party SDKs for installation in a mobile application under development. In one example approach, the SDDP serves as a developer toolkit, simplifying application development for a number of platforms and operating systems.

Figure 1:
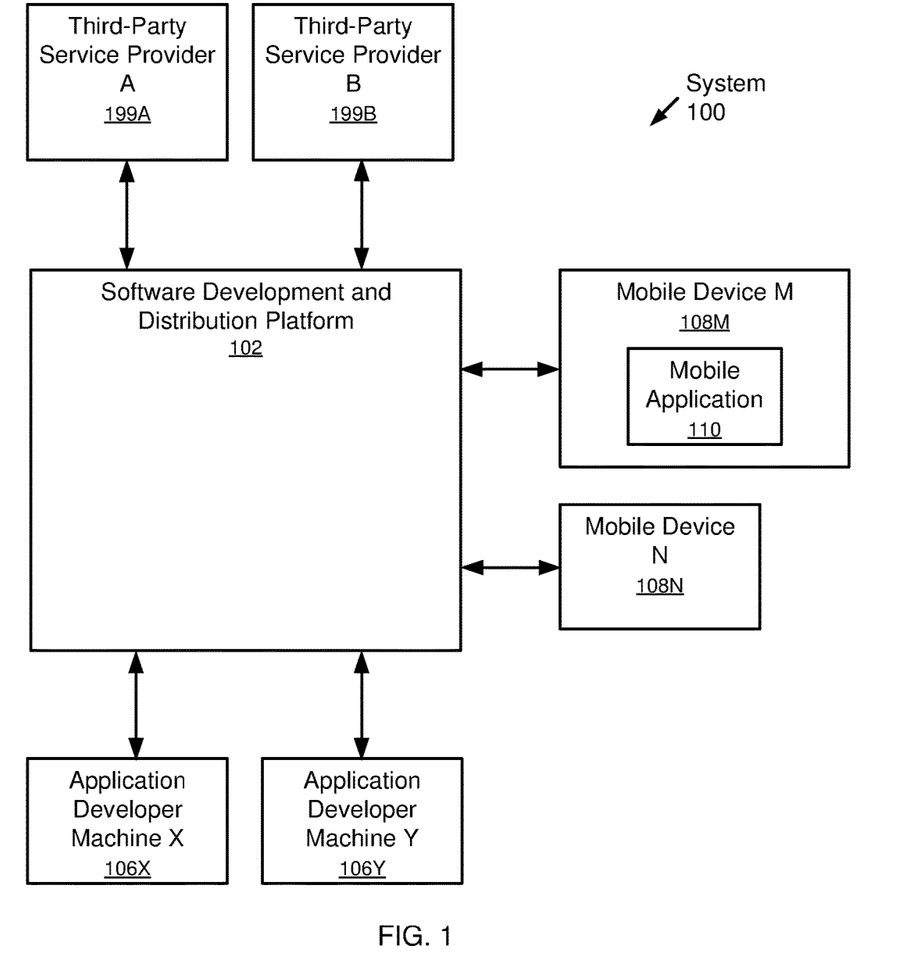
FIG. 1 shows a system block diagram in accordance with one or more aspects of the invention.

FIG. 1 shows a system (100) in accordance with one or more aspects of the invention. As shown in FIG. 1, the system (100) has multiple components including an SDDP (102), multiple third-party service providers (e.g., Third-Party Service Provider A (199A), Third-Party Service Provider B (199B)), one or more application developer machines (e.g., Application Developer Machine X (106X), Application Developer Machine Y (106Y)), and one or more mobile devices (e.g., Mobile Device M (108M), Mobile Device N (108N)). As also shown in FIG. 1, the third-party service providers (199A, 199B), the application developer machines (106X, 106Y), and the mobile devices (108M, 108N) are connected to the SDDP (102) using one or more networks having wired and/or wireless segments. Although not shown in FIG. 1, the mobile devices (108M, 108N) may also be directly connected to the third-party service providers (199A, 199B) using one or more networks having wired and/or wireless segments. In other words, the mobile devices (108M, 108N) may communicate with the third-party service providers (199A, 199B) independently of the SDDP (102).

In one or more aspects of the invention, the system (100) includes the third-party service providers (199A, 199B). Each third-party service provider (199A, 199B) may execute on one or more computing devices (e.g., a server, a personal computer (PC), a laptop, a tablet PC, a smart phone, a kiosk, etc.). Each third-party service provider (199A, 199B) develops and publishes one or more third-party SDKs. Each third-party SDK provides one or more services, functions, content, or capabilities that can be requested by a software application (e.g., mobile application (110)) in which the third-party SDK is installed. These services, functions, content, or capabilities may be internal to the third-party SDK. Additionally, or alternatively, these services, functions, content, or capabilities may be provided by a third-party API (not shown), and the third-party SDK is a mechanism for the software application to issue API calls to the third-party API and access the services, functions, etc.

In one or more aspects of the invention, the system (100) includes one or more application developer machines (106X, 106Y). Each application developer machine (106X, 106Y) may correspond to a server, a personal computer (PC), a laptop, a tablet PC, a smart phone, a kiosk, etc. The application developer machines (106X, 106Y) provide an interface (e.g., GUI) that an application developer or a team of application developers can utilize to design, program, code, debug, etc. a mobile application (e.g., Mobile Application (110)). In one or more aspects of the invention, these mobile applications include one or more third-party SDKs. The application developer machine (106X, 106Y) may obtain (e.g., for a fee) the third-party SDKs from the SDDP (102). Additional details regarding the application developer machines (106X, 106Y) are discussed below.

In one or more aspects of the invention, the system (100) includes multiple mobile devices (i.e., Mobile Device M (108M), Mobile Device N (108N)). These mobile devices (108M, 108N) may correspond to smart phones, PC tablets, laptops, personal digital assistants (PDAs), watches, etc. These mobile devices (108M, 108N) may execute mobile applications (e.g., mobile application (110)) developed on the application developer machines (106X, 106Y). The mobile applications may be obtained (e.g., for a fee) from the SDDP (102). The mobile application (110) may access the third-party SDKs installed in the mobile application (110) during execution.

In one or more aspects of the invention, the system (100) includes the SDDP (102). The SDDP (102) acts as an intermediary (i.e., a trusted arbitrator) between the third-party service providers (199A, 199B), the mobile devices (108M, 108N), and the application developer machines (106X, 106Y). The SDDP (102) may correspond to one or more servers, mainframes, PCs, or any other type of hardware computing devices. The SDDP (102) may be considered an SDK marketplace. The SDDP (102) may be configured to perform many functions including, for example, generating profiles for third-party SDKs and/or third-party service provides (199A, 199B); generating profiles for mobile applications (e.g., mobile application (110)); generating profiles for end-users; recommending and sending third-party SDKs to application developer machines (106X, 106Y) for installation in mobile applications under development; facilitating message exchanges between third-party service providers (199A, 199B) and application developer machines (106X, 106Y); generating and/or registering a handle for mobile applications (110); deploying mobile applications (110) on mobile devices (108M, 108N) for execution; etc. Additional details regarding the SDDP (102) are discussed below.

In one example approach, the SDDP (102) includes a base library and SDKs are written to use the base library. In one example approach, new SDKs are evaluated to determine if they can be trusted; only trusted SDKs are added to SDDP (102).

Although FIG. 1 shows only two third-party service providers (199A, 199B), only two mobile devices (108M, 108N), and only two application developer machines (106X, 106Y), those skilled in the art, having the benefit of this detailed description, will appreciate that there may be any number of third-party service providers, mobile devices, and application developer machines. Similarly, each mobile device (108M, 108N) may execute any number of mobile applications.

Although FIG. 1 shows a mobile application (110) executing on mobile device (108N), in one or more aspects of the invention, all systems and processes disclosed is this detailed description also apply to applications executing on non-mobile devices (e.g., desktop personal computers (PCs), kiosks, servers, mainframes, etc.). In such embodiments, the application developer machines (106X, 106Y) may develop applications for deployment on the non-mobile devices. Further, these applications executing on the non-mobile devices would also have third-party SDKs.

Figure 2:
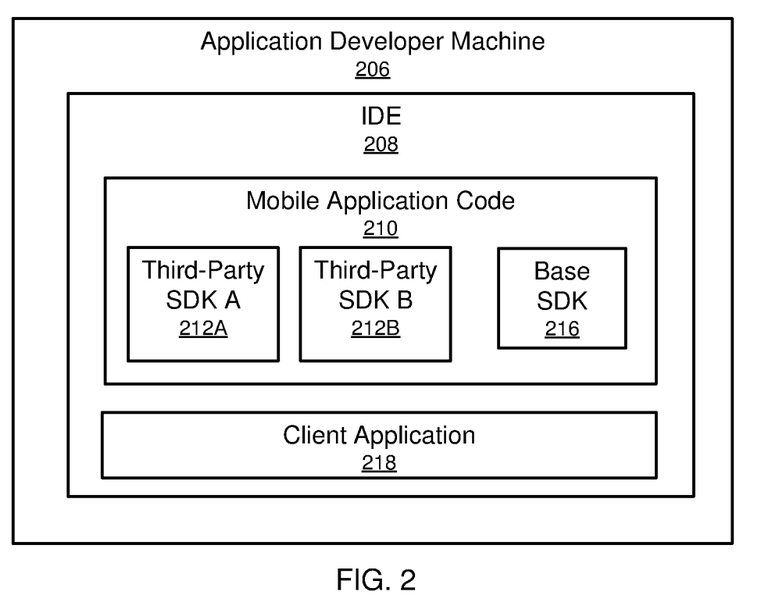
FIG. 2 shows an application developer machine in accordance with one or more aspects of the invention.

FIG. 2 shows an application developer machine (206) in accordance with one or more aspects of the invention. The application developer machine (206) may be essentially the same as the application developer machines (106X, 106Y) discussed above in reference to FIG. 1. In one or more aspects of the invention, the application developer machine (206) includes an integrated development environment (IDE) (208). The IDE (208) is a software application that provides comprehensive facilities to application developers for the development of mobile applications. The IDE (208) may include a source code editor to write code (210) for the mobile application, build automation tools, code import tools, and a debugger. In one example approach, the IDE (208) is integrated in the SDDP and is downloaded to the application developer machine (206) during initialization. In another example approach, an SDDP plugin is downloaded from the SDDP (102) and installed in the IDE (208), which is installed in the application developer machine (206).

As shown in FIG. 2, the IDE (208) includes a client application (218). In one or more aspects of the invention, the client application (218) is a plugin to the IDE (208). Additionally, or alternatively, the client application (218) may be a software application that interacts with the IDE (208), but is external to the IDE (208) (i.e., not a plug-in, but rather a stand-alone application). The client application (218) facilitates development of a mobile application and communication with the SDDP (102).

As discussed above, one or more third-party SDKs may be included (i.e., installed, incorporated, etc.) in a mobile application. Specifically, the application developer may be presented with a catalog of third-party SDKs that can be selected for inclusion with the mobile application under development. As also discussed above, when the mobile application is executing, one or more third-party SDKs may issue API calls to a third-party API to increase the functionality and capabilities of the mobile application.

In one or more aspects of the invention, the client application (218) is configured to send recommendation requests for third-party SDKs to the SDDP (102). The recommendation requests may include a target mobile operating system for the mobile application and a type of SDK (e.g., gaming SDK, mapping SDK, monetizing SDK, etc.) desired by the application developer for installation in the mobile application. The recommendation request may also include the identity of other third-party SDKs (e.g., third-party SDK A (212A), third-party SDK B (212B)) already installed in the mobile application. The client application (218) may receive one or more recommendations from the SDDP (102) identifying third-party SDKs to install. In one example approach, SDKs installed in the SDDP include both proprietary service SDKs and third-party service SDKs; client application (218) may receive one or more recommendations from the SDDP (102) identifying recommended proprietary and third-party SDKs to install.

In one or more aspects of the invention, the client application (218) is configured to send installation requests for third-party SDKs to the SDDP (102). An installation request may be sent after a recommendation has been received by the client application (218) and/or after the available third-party SDKs have been viewed by the application developer. The client application (218) may receive the third-party SDK from SDDP (120) and may modify the code (210) of the mobile application under development to include the third-party SDK. This modification may take place with minimal input (e.g., a single click) or no input from the application developer.

As shown in FIG. 2, two third-party SDKs (i.e., 212A, 212B) have been added to the code (210) for the mobile application. In one or more aspects of the invention, the client application (218) is used by application developers to receive and view messages from the third-party service providers that published the third-party SDKs (212A, 212B). The client application (218) may also be used to compose and send feedback messages to the third-party service providers.

Still referring to FIG. 2, in some example approaches the code (210) is adapted to include a base SDK (216). When the mobile application is deployed and executing on a mobile device, the base SDK (216) is configured to collect data (e.g., metrics) regarding the usage and operations of the deployed mobile application on the mobile device. The collected data may include how often (i.e., the frequency) the mobile application is executed on the mobile device; the duration of each execution; interactions (e.g., functions calls) between the code (210) of the mobile application and the third-party SDKs (212A, 212B); crash dumps following a crash of the mobile application; the money being generated by the mobile application due to a monetization SDK; etc. The amount and type of data that is exposed for collection may be customized by the application developer. The collected data may also correspond to the mobile device itself, including power consumption of the mobile device, how frequently the mobile device is powered on, other applications installed on the mobile device, etc. Moreover, the collected data may be sent to the SDDP (102) (discussed below). Although only a single base SDK (216) is shown, there may be any number of base SDKs (216) installed in the code (210), with each base SDK responsible for collecting and/or sending, to the SDDP (102), a specific type of data.

In other example approaches, a base SDK (216) is not needed. Instead, in one example approach, one or more of the service SDKs are configured to collect data (e.g., metrics) regarding the usage and operations of the deployed mobile application on the mobile device. The collected data may include how often (i.e., the frequency) the mobile application is executed on the mobile device; the duration of each execution; interactions (e.g., functions calls) between the code (210) of the mobile application and the other third-party SDKs (212A, 212B); crash dumps following a crash of the mobile application; the money being generated by the mobile application due to a monetization SDK; etc. The amount and type of data that is exposed for collection may be customized by the application developer. The collected data may also correspond to the mobile device itself, including power consumption of the mobile device, how frequently the mobile device is powered on, other applications installed on the mobile device, etc. Moreover, the collected data may be sent to the SDDP (102) (discussed below). Such functionality may be distributed between two or more of the service SDKs installed in the code (210), with each service responsible for collecting and/or sending, to the SDDP (102), a specific type of data.

Although the code (210) for the mobile application is shown as having only two third-party SDKs (212A, 212B), those skilled in the art, having the benefit of this detailed description, will appreciate that any number of third-party SDKs may be added to the code (210) and thus included in the mobile application under development.

Figure 3:
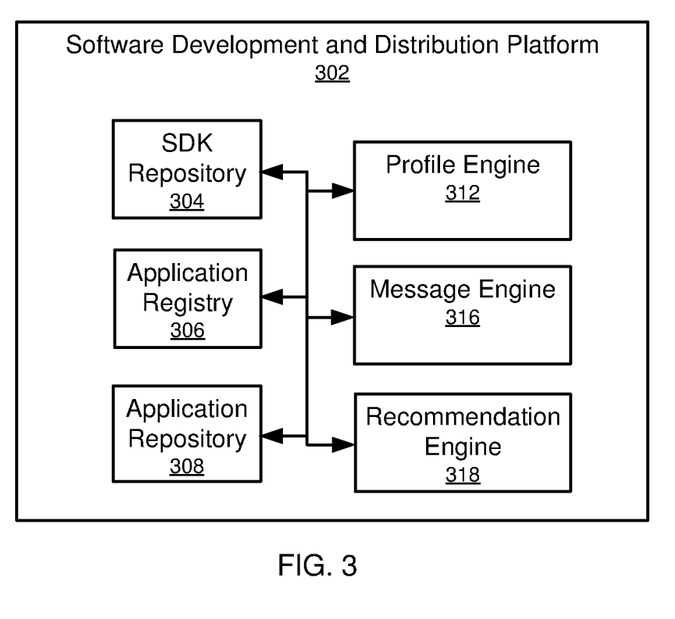
FIG. 3 shows a software development and distribution platform in accordance with one or more aspects of the invention.

FIG. 3 shows an SDDP (302) in accordance with one or more aspects of the invention. The SDDP (302) may be essentially the same as the SDDP (102), discussed above in reference to FIG. 1. As shown in FIG. 3, the SDDP (302) has multiple components including, for example, an SDK repository (304), an application registry (306), an application repository (308), a profile engine (312), a message engine (316), and a recommendation engine (318). Each of these components (304, 306, 308, 312, 316, 318) may be located on the same computing device (e.g., server, mainframe, etc.) or may be located on or spread across different computing devices connected by networks having wired and/or wireless segments.

In one or more aspects of the invention, the SDDP (102) includes the message engine (316). The message engine (316) facilitates the exchange (e.g., sending, receiving) of messages between third-party service providers and application developer machines connected to the SDDP (302). The messages may be in the form of email, text messages, fax, applets, etc. The messaging engine (316) may enable point-to-point messaging (e.g., a message from one third-party service provider to one application developer machine) and/or broadcast messages (e.g., a message from one third-party service provider to many application developer machines). The message engine (316) may provide a directory of all the third-party service providers and application developer machines connected to the SDDP (302) in order for the sender to target the recipient. The message engine (316) may archive all exchanged messages for future searching and retrieval.

The content of the messages may include details regarding all the capabilities and functionalities available via a third-party SDK from the third-party service provider and how to access these capabilities/functionalities. Additionally, or alternatively, the content of the messages may include news regarding proposed and/or finalized changes (e.g., upgrades, new versions, etc.) to the available capabilities and functionalities and/or to the third-party SDK. Additionally, or alternatively, the content of the messages may include known technical problems or bugs with one or more of the capabilities and functionalities and/or the third-party SDK.

The content of the messages may include feedback from application developers regarding proposed and/or finalized changes to the third-party SDKs. Additionally, or alternatively, the content of the messages may include reports of technical problems with third-party SDKs discovered by application developers. In one or more aspects of the invention, messages from the application developers or application developer machines may be referred to as feedback messages.

In one or more aspects of the invention, the message engine (316) is configured to send notifications to the third-party service providers. Each notification may identify an application developer machine that downloaded the third-party SDK published by the third-party service provider. The notification may also indicate the IDE executing on the application developer machine and/or other third-party SDKs installed in the mobile application under development on the application developer machine.

In one or more aspects of the invention, the SDDP (302) includes the SDK repository (304). The SDK repository (304) may correspond to a database or any other searchable data structure. The SDK repository (304) stores third-party SDKs published by third-party service providers. Additionally, or alternatively, the SDK repository (304) may store third-party SDKs from any source. The third-party SDKs in the SDK repository (304) are available for download, for free or for a fee, to the application development machines. The SDK repository (304) may be viewable and searchable (e.g., via client application (218)) by application developers. Certain third-party SDKs may be excluded from view based on the geographical location of the application developer.

In one or more aspects of the invention, the SDDP (302) includes the application repository (308). The application repository (308) may correspond to a database or any other searchable data structure. The application repository (308) stores mobile applications that have been developed on the application development machines Additionally, or alternatively, the application repository (308) stores mobile applications from any source. The applications in the application repository (304) are available for download, for free or for a fee, to mobile devices operated by end users. The application repository (308) may be viewable and searchable by end users. Certain applications may be excluded from view based on the geographical location of the end-user.

In one or more aspects of the invention, the SDDP (302) includes the profile engine (312). The profile engine (312) is configured to generate one or more profiles for each third-party SDK. A profile may include one or more of: the features of the third-party SDK; screenshots for the SDK; the number of mobile applications that have installed the third-party SDK; the number of times these applications have been downloaded by end users; the money generated by mobile application using the third-party SDK; the types (e.g., hardware and/or operating system) of mobile applications that use the third-party SDK; the identity of each mobile application that has installed the third-party SDK; the stability/reliability of the third-party SDK (e.g., number of crashes caused by the SDK); the ratings (e.g., 4 out of 5, 3 stars, etc.) of the third-party SDK by the application developers and/or end users; feedback messages regarding the third-party SDK; the number of detected bugs in the third-party SDK; the identity of each end user that downloaded a mobile application having the third-party SDK; the release date of the third-party SDK; bread crumbs between applications on the same mobile device having the third-party SDK via deep linking; etc. Those skilled in the art, having the benefit of this detailed description, will appreciate that the above list is not exhaustive and that the profile may include all sorts of content and analytics involving the third-party SDK. The third-party SDK may be searchable and/or sortable by any analytic.

In one or more aspects of the invention, the profile engine (312) is configured to obtain the data (e.g., metrics) for the profile from any source, including the third-party service provider that published the third-party SDK and the other SDKs and base SDK(s), if any, installed in the same application(s) as the third-party SDK, discussed above in reference to FIG. 2. The profile engine (312) may perform one or more calculations or statistical analyses on the obtained data to generate the profile. In some example approaches, application developers are alerted if, for example, a service crashed, a new bug is discovered or if one or more of the calculations or analyses by profile engine (312) exceed a pre-defined or adaptive threshold.

In one or more aspects of the invention, different portions of the profile are associated with different access rights. In other words, not every party is granted full access (i.e., visibility into) to the profile. The level of access may vary among and between end users, application developers, other third-party service providers (i e, third-party service providers that did not publish the third-party SDK), and the third-party service provider that published the third-part SDK. Additionally, or alternatively, the profile may be partially replicated and spread across multiple profiles, with each profile being exclusively available for viewing/access by one of the mentioned parties (i.e., application developers, other third-party service providers, etc.).

In one or more aspects of the invention, the profile engine (312) is configured to generate one or more profiles for each mobile application. A profile may include one or more of: the features of the application; screenshots for the application; the number of mobile devices that have downloaded the application; the money generated by mobile application using third-party SDKs; the types (e.g., hardware and/or operating system) of mobile applications that downloaded the application; the identity of each third-party SDK installed in the application; the stability/reliability of the application (e.g., number of crashes); the ratings (e.g., 4 out of 5, 3 stars, etc.) of the application by the end users; feedback messages regarding the application; the number of detected bugs in the application; the identity of each end user that downloaded the application; the release date of the application; etc. Those skilled in the art, having the benefit of this detailed description, will appreciate that the above list is not exhaustive and that the profile may include all sorts of content and analytics involving the application. The application may be searchable and/or sortable by any analytic.

In one or more aspects of the invention, the profile engine (312) is configured to obtain the data (e.g., metrics) for the profile from any source, including the application developer and the other SDKs and base SDK(s), if any, installed in the application, discussed above in reference to FIG. 2. Data (e.g., metrics regarding API calls) for the application may also be obtained from the third-party service providers that published the third-party SDKs installed in the application. In such scenarios, the data may be based on records maintained by the third-party service providers regarding the application and/or the end users of the application. The profile engine (312) may perform one or more calculations or statistical analyses on the obtained data to generate the profile.

In one example approach, a mobile user may download an application from an app store and install the application in their mobile device. SDKs installed in the application communicate with SDDP (302) (e.g., phone home) to report their status. This information is added by profile engine (312) to the application and SDK profiles. In some example approaches, this information is also forwarded in real-time to the application developer and/or the associated third-party service provider.

In one or more aspects of the invention, different portions of the profile are associated with different access rights. In other words, not every party is granted full access (i.e., visibility into) to the profile of the application. The level of access may vary among and between end users, third-party service providers, the developer of the application, and the developers of other applications. Additionally, or alternatively, the profile may be partially replicated and spread across multiple profiles, with each profile being exclusively available for viewing/access by one of the mentioned parties (i.e., other application developers, third-party service providers, etc.).

In one or more aspects of the invention, the recommendation engine (318) is configured to generate a recommendation identifying a third-party SDK for installation in a mobile application under development. The recommendation may be generated and sent to the application development machine in response to a recommendation request (discussed above). The recommendation engine (318) may parse the recommendation request to extract one or more parameters (e.g., desired type of third-party SDK, target operating system for the mobile application, other third-party SDKs already installed in the mobile application under development, etc.) for use in generating the recommendation. These parameters may be used as keys in a search of the profiles of the available third-party SDKs. One or more third-party SDKs that are compatible with the recommendation request may be identified in the recommendation. In one or more aspects of the invention, only third-party SDKs having at least a minimum rating (e.g., 4 out of 5 stars) are identified in a recommendation.

In one or more aspects of the invention, the recommendation engine (318) generates a recommendation based on an earlier version of the mobile application (i.e., a version of the mobile application that was previously deployed). Specifically, the recommendation engine (318) may forward the metrics associated with the previously deployed version to multiple monetizing SDKs. Each monetizing SDK may estimate, based on the metrics, a revenue stream that would have been attributable to the previous version of the application if the previous version of the application had installed the monetizing SDK. The identity of the monetizing SDK with the largest estimated revenue stream (or second largest revenue stream, etc.) may be included in the recommendation sent to the application developer machine.

In one or more aspects of the invention, the SDDP (302) includes the application registry (306). The application registry is configured to generate and/or store application handles. The handles may be searchable. Following the generation of a handle for an application under development, it may be sent to the corresponding application developer machine.

Figure 4:
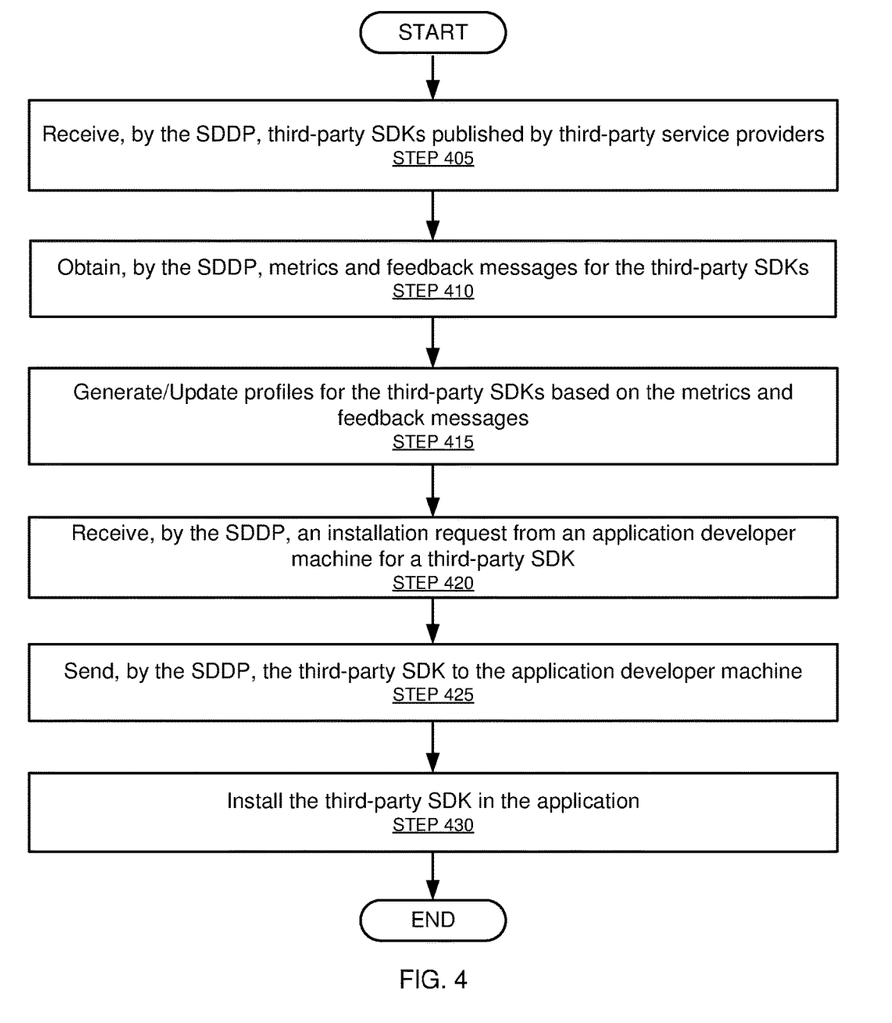
FIGS. 4-6 show flowcharts in accordance with one or more aspects of the invention.

FIG. 4 shows a flowchart in accordance with one or more aspects of the invention. The flowchart depicts a process for operating an SDDP. One or more of the steps in FIG. 4 may be performed by the components of the system (100), discussed above in reference to FIG. 1, and by the components of the SDDP (302), discussed above in reference to FIG. 3. In one or more aspects of the invention, one or more of the steps shown in FIG. 4 may be omitted, repeated, and/or performed in a different order than the order shown in FIG. 4. Accordingly, the scope of the disclosure should not be considered limited to the specific arrangement of steps shown in FIG. 4. The process depicted in FIG. 4 may be executed before, during, or after the process depicted in any other flowchart disclosed in this detailed description.

Initially, one or more third-party SDKs are received by the SDDP (405). The third-party SDKs are published by third-party service providers. The third-party SDKs provide additional content and functionality to mobile applications that have installed the third-party SDKs. For example, the third-party SDKs may issue, on behalf of the mobile application, API calls to third-party APIs to access the additional content and functionality. The received third-party SDKs may be of any type (e.g., navigational SDKs, monetization SDKs, gaming SDKs, etc.). The third-party service providers may provide additional data detailing the functionality of the third-party SDKs, screen shots from user interfaces of the third-party SDKs, example code snippets, etc.

At 410, metrics and feedback messages for the third-party SDKs are received by the SDDP. 410 may take place after one or more of the third-party SDKs have been installed in applications and the applications have been deployed. The feedback messages may be from application developers that have installed and tested one of the third-party SDKs in a mobile application. The feedback messages may be from end users that have downloaded mobile applications having one of the third-party SDKs. The feedback messages may identify bugs in one or more of third-party SDKs. The metrics may be obtained from a variety of sources (e.g., a base SDK, discussed above in reference to FIG. 2, or other installed SDKs) and may include the number of mobile applications that have installed the third-party SDK; the number of times these applications have been downloaded by end users; the money generated by mobile application using the third-party SDK; the types (e.g., hardware and/or operating system) of mobile applications that use the third-party SDK; etc.

At 415, profiles are generated for the third-party SDKs. The profiles may be generated based on the feedback messages, the metrics, and content provided by the third-party service providers. The profiles may be associated with access rights. In other words, not every party is granted full access (i.e., visibility into) to the profile. For a given third-party SDK, the level of access may vary among and between end users, application developers, other third-party service providers (i.e., third-party service providers that did not publish the third-party SDK), and the third-party service provider that published the third-party SDK.

At 420, an installation request is received for a third-party SDK. The installation request is received from an application developer machine having a mobile application under development. The installation request may be received after the application developer has browsed the profile of the third-party SDK. The installation request may be received after sending a recommendation to the application developer identifying the third-party SDK.

At 425, the third-party SDK is sent to the application developer machine. In one example approach sending the third-party SDK includes transmitting code to the application developer machine. In another example approach, sending the third-party SDK includes transmitting, to the application developer machine, an identifier identifying the third-party SDK, receiving an install command from the application developer machine requesting that the identified third-party SDK be installed and transmitting the third-party SDK to the application developer machine for installation in the application under development.

In one example approach, a notification may also be sent to the third-party service provider that published the application. The notification may identify the IDE executing on the application developer machine and/or other third-party SDKs installed in the mobile application under development.

At 430, the third-party SDK is installed in the application under development. Specifically, a client application executing on the application developer machine modifies the code of the application under development to include the third-party SDK. This modification may require little to no input from the user.

Figure 5:
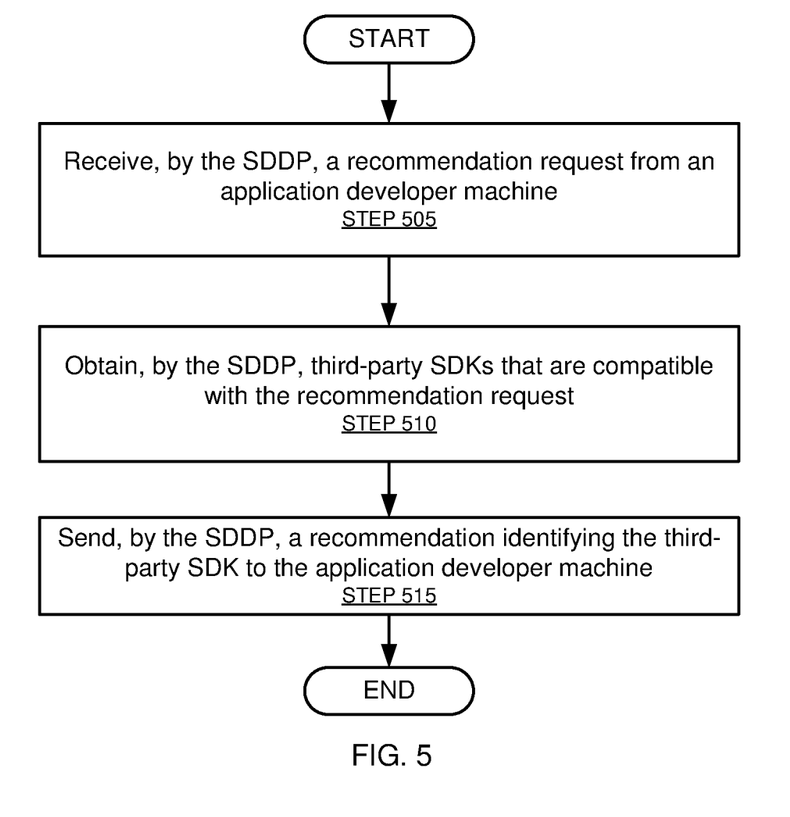

FIG. 5 shows a flowchart in accordance with one or more aspects of the invention. The flowchart depicts a process for operating an SDDP. One or more of the steps in FIG. 5 may be performed by the components of the system (100), discussed above in reference to FIG. 1, and by the components of the SDDP (302), discussed above in reference to FIG. 3. In one or more aspects of the invention, one or more of the steps shown in FIG. 5 may be omitted, repeated, and/or performed in a different order than the order shown in FIG. 5. Accordingly, the scope of the disclosure should not be considered limited to the specific arrangement of steps shown in FIG. 5. The process depicted in FIG. 5 may be executed before, during, or after the process depicted in any other flowchart disclosed in this detailed description.

Initially, a recommendation request is received by the SDDP (505). The recommendation request may be received from an application developer machine on which a mobile application is under development. The recommendation request may have multiple parameters including, for example, a target operating system for the mobile application under development, a type of SDK desired by the application developer, the identity of one or more third-party SDKs already installed in the application under development, etc.

At 510, third-party SDKs compatible with the recommendation request are obtained. Specifically, the recommendation request is parsed and the parameters are extracted. The parameters may be used as keys in a search of third-party SDK profiles. In one or more embodiments, third-party SDKs having a rating that is less than a threshold (e.g., less than 3.5 out of 5) are excluded from the search.

At 515, a recommendation is sent to the application developer machine. The recommendation identifies at least one of the compatible third-party SDKs. In one or more embodiments, only the compatible third-party SDK with the highest rating is identified in the recommendation.

Figure 6:
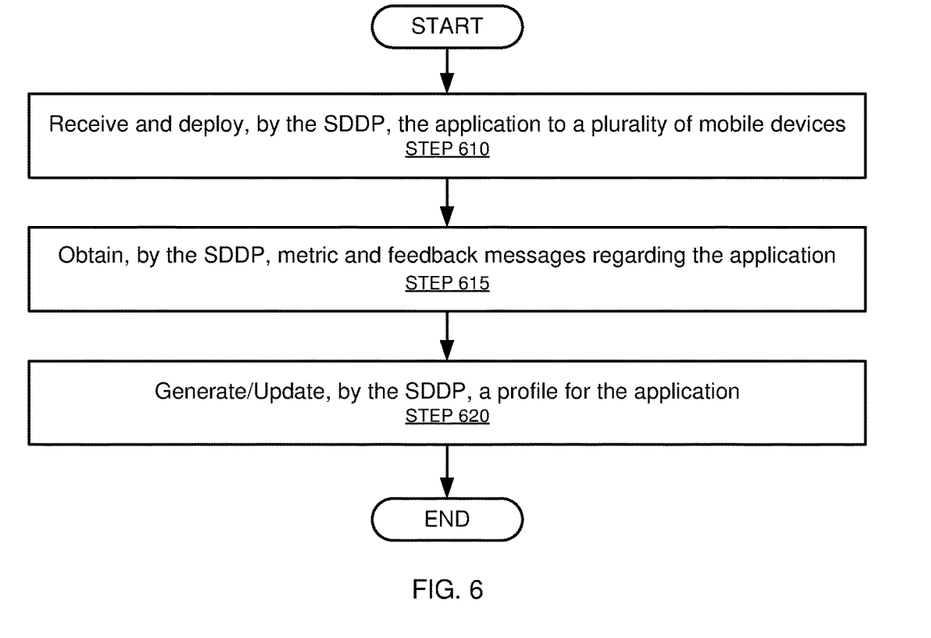

FIG. 6 shows a flowchart in accordance with one or more aspects of the invention. The flowchart depicts a process for operating an SDDP. One or more of the steps in FIG. 6 may be performed by the components of the system (100), discussed above in reference to FIG. 1, and by the components of the SDDP (302), discussed above in reference to FIG. 3. In one or more aspects of the invention, one or more of the steps shown in FIG. 6 may be omitted, repeated, and/or performed in a different order than the order shown in FIG. 6. Accordingly, the scope of the disclosure should not be considered limited to the specific arrangement of steps shown in FIG. 6. The process depicted in FIG. 6 may be executed before, during, or after the process depicted in any other flowchart disclosed in this detailed description.

Initially, the SDDP receives a mobile application that has been developed by an application developer (610). The mobile application may include multiple third-party SDKs, proprietary SDKs and/or one or more base SDKs, including SDKs for collecting and reporting data. One or more of the third-party SDKs may have been previously downloaded from the SDDP to the application developer machine on which the application was under development. The application may be stored in a repository and made available for downloading, for a fee, by end users. In other words, the SDDP may deploy the mobile application on the mobile devices of end users.

At 615, metrics and feedback messages for the mobile application are received by the SDDP. The feedback messages may be from end users that have downloaded the mobile application. The feedback messages may identify bugs in one or more of third-party SDKs. The metrics may be obtained from a variety of sources (e.g., base SDK, discussed above in reference to FIG. 2) and may include the number of mobile devices that have downloaded the application; the money generated by mobile application using third-party SDKs; the types (e.g., hardware and/or operating system) of mobile applications that downloaded the application; the identity of each third-party SDK installed in the application; the stability/reliability of the application (e.g., number of crashes); the ratings (e.g., 4 out of 5, 3 stars, etc.) of the application by the end users; etc. Some of the metrics may be received from the third-party service providers that published third-party SDKs installed in the mobile application. In such scenarios, the data may be based on records maintained by the third-party service providers regarding the application and/or the end users of the application.

At 620, a profile for the application is updated or generated. The profile may be generated/updated based on the feedback messages, the metrics, and content provided by the application developer. The profiles may be associated with access rights. In other words, not every party is granted full access (i.e., visibility into) to the profile. For a given application, the level of access may vary among and between end users, the developer of the mobile application, and/or other application developers (i.e., developers that did not developer the mobile application, third-party service providers, etc.). The profile may be searchable and sortable according to any metric.

Figure 7:
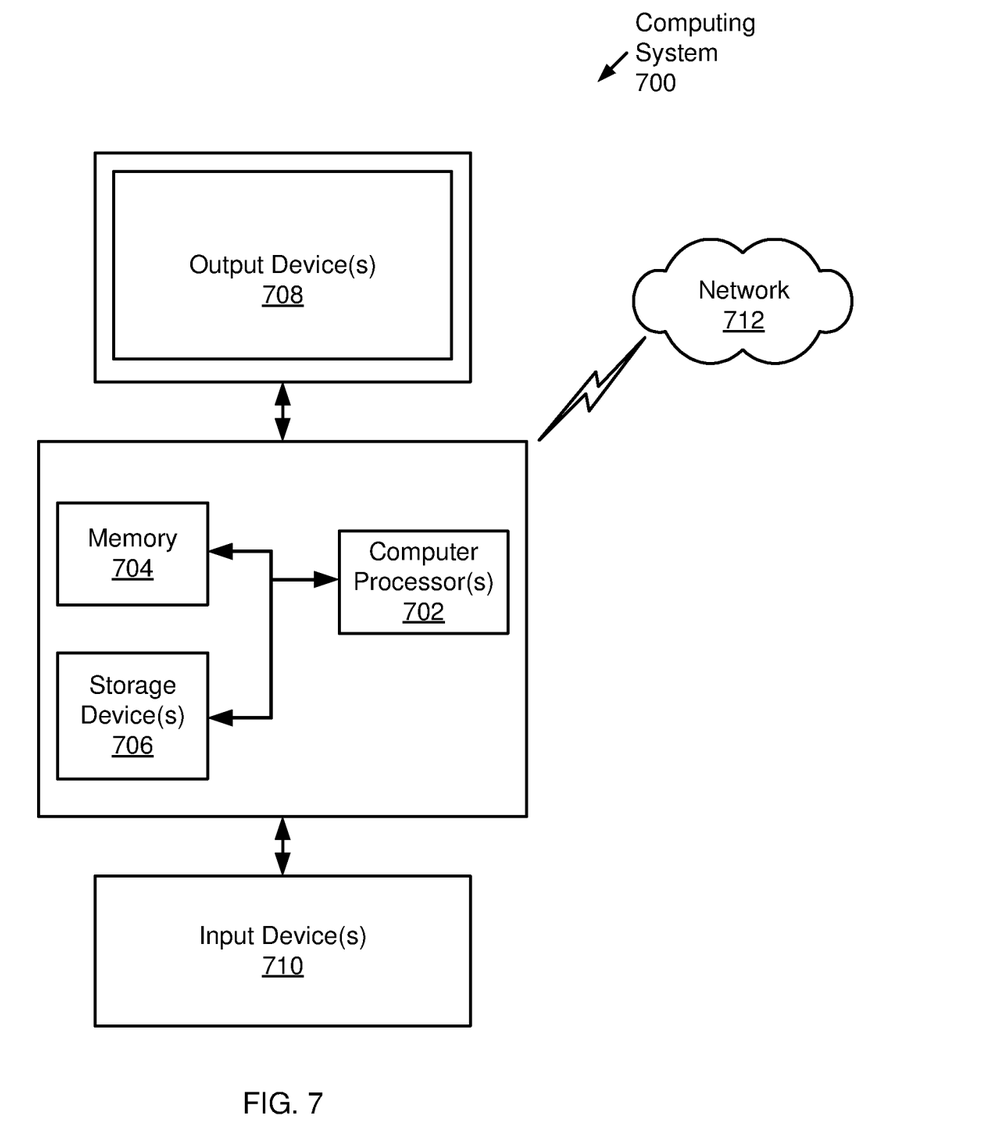
FIG. 7 shows a computer system in accordance with one or more aspects of the invention.

Aspects of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more aspects of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform aspects of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform aspects of the invention.

Further, one or more elements of the aforementioned computing system (700) may be located at a remote location and connected to the other elements over a network (712). Further, one or more aspects of the invention may be implemented on a distributed system having a plurality of nodes, where each portion of system (700) may be located on a different node within the distributed system. In one example approach, the node corresponds to a distinct computing device. Alternatively, the node may correspond to a computer processor with associated physical memory. The node may alternatively correspond to a computer processor or micro-core of a computer processor with shared memory and/or resources.

The software development and distribution platform (SDDP) described provides a mechanism for simplifying the addition of services to applications under development. Third-party SDKs are stored in the SDDP, each third-party SDK published by a third-party service provider and each third-party SDK accessing one or more services provided by the third-party service provider who published the SDK. The SDDP receives a request from an application developer for a third-party SDK, the request including an SDK type, searches the SDDP for third-party SDKs that match the SDK type and transmits a response indicating one or more third-party SDKs that match the SDK type. In some examples, an SDDP plugin is installed into an integrated design environment in an application development machine to simplify the addition of SDKs to the application under development. In some examples the SDDP recommends an SDK based on parameters transferred with the SDK request and the application developer installs the recommended SDK by selecting the recommended SDK. The result is an elegant, modular design system which can easily add and update services to applications both under development and deployed.

The system and method becomes even more powerful when SDKs are examined and approved before being accepted into the SDDP. Application developers don't have to independently investigate possible service providers and their SDKs. Instead they can rely on the trusted SDKs in the SDDP.

In one or more examples, the functions described above may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random access memory (RAM), read only memory (ROM), electrically erasable programmable read-only memory (EEPROM), compact disc read-only memory (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples.

While the invention has been described with respect to a limited number of embodiments, those skilled in the art, having benefit of this disclosure, will appreciate that other embodiments can be devised which do not depart from the scope of the disclosure herein.

What is claimed is:

1. A method of operating a software development and distribution platform (SDDP), comprising:
   receiving, by the SDDP, a plurality of third-party software development kits (SDKs), each third-party SDK published by a third-party service provider, the plurality of third-party SDKs including a first third-party SDK;
   storing, by the SDDP, the plurality of third-party SDKs;
   receiving, by the SDDP and from an application developer machine, an installation request for the first third-party SDK;
   sending, by the SDDP and in response to the installation request, the first third-party SDK for installation in an application under development; and
   sending, by the SDDP and in response to sending the first third-party SDK, a notification to a third-party service provider that published the first third party SDK, the notification identifying an integrated development environment (IDE) executing on the application developer machine and at least one third-party SDK already installed in the application under development.

2. The method of claim 1, further comprising:
   receiving, by the SDDP, the application comprising the first third-party SDK; and
   distributing, by the SDDP, the application to a plurality of mobile devices for execution on the plurality of mobile devices.

3. The method of claim 1, further comprising:
   obtaining, by the SDDP, a plurality of metrics for the first third-party SDK;
   receiving, by the SDDP, a plurality of feedback messages for the first third-party SDK from a plurality of application developers;
   generating, by the SDDP, a profile for the first third-party SDK based on at least one parameter selected from a group of parameters consisting of one or more of the plurality of metrics and one or more of the plurality of feedback messages; and
   receiving, by the SDDP, a request to view the profile.

4. The method of claim 1, further comprising:
   receiving, by the SDDP and after the application comprising the first third-party SDK is deployed on a plurality of mobile devices, a plurality of metrics from a third-party service provider that published the first third-party SDK, wherein the metrics are based on records maintained by the first third-party service provider regarding at least one parameter selected from a group of parameters consisting of the application and the end users of the application;
   generating, by the SDDP, a profile for the application based on the plurality of metrics; and
   receiving, by the SDDP, a request to view the profile from a developer of the application.

5. The method of claim 1, wherein receiving the installation request comprises:
   receiving, by the SDDP and from the application developer machine, a recommendation request comprising a target operating system of the application and an SDK type; and
   sending, by the SDDP and to the application developer machine, a recommendation based on the target operating system and the SDK type, the recommendation identifying the first third-party SDK.

6. The method of claim 5, wherein the recommendation request identifies at least one third-party SDK installed in the application under development.

7. The method of claim 5, wherein the recommendation is based on a geographic region of the application developer machine.

8. The method of claim 1, further comprising:
   obtaining, by the SDDP, a plurality of metrics for a previous version of the application executing on a plurality of mobile devices;
   sending the plurality of metrics to publishers of monetizing SDKs, including the publisher of the first third-party SDK;
   receiving, by the SDDP and from each of the publishers of the monetizing SDKs, an estimated revenue stream for the respective publisher's monetizing SDK if installed in the previous version of the application;
   analyzing the estimated revenue streams in the SDDP; and
   recommending the first third-party SDK as a recommended SDK based on the analysis of the estimated revenue streams.

9. The method of claim 1, further comprising:
   receiving, by the SDDP and from the application development machine, a request to register the application; and
   adding, by the SDDP, a handle of the application to a registry in response to the request.

10. The method of claim 9, further comprising:
    generating, by the SDDP, the handle for the application; and
    sending, by the SDDP, the handle to the application developer machine.

11. A software development and distribution platform (SDDP), comprising:
    at least one processor; and
    a computer-readable storage medium storing instructions that, when executed, cause the at least one processor to:
       receive a plurality of third-party software development kits (SDKs), each third-party SDK published by a third-party service provider, the plurality of third-party SDKs including a first third-party SDK;
       store the plurality of third-party SDKs;
       receive, from an application developer machine, an installation request for the first third-party SDK;
       send, in response to the installation request, the first third-party SDK for installation in an application under development; and
       send, in response to sending the first third-party SDK, a notification to a third-party service provider that published the first third party SDK, the notification identifying an integrated development environment (IDE) executing on the application developer machine and at least one third-party SDK already installed in the application under development.

12. The SDDP of claim 11, wherein the computer-readable storage medium further stores instructions that, when executed, cause the at least one processor to:
  receive, from the application developer machine, a recommendation request comprising a target operating system of the application and an SDK type; and
  send, to the application developer machine, a recommendation based on the target operating system and the SDK type, the recommendation identifying the first third-party SDK.

13. The SDDP of claim 11, wherein the computer-readable storage medium further stores instructions that, when executed, cause the at least one processor to:
  receive, from the application development machine, a request to register the application; and
  add a handle of the application to a registry in response to the request.

14. A computer-readable storage medium storing instructions that, when executed by at least one processor in a software development and distribution platform (SDDP), cause the at least one processor to:
  receive a plurality of third-party software development kits (SDKs), each third-party SDK published by a third-party service provider, the plurality of third-party SDKs including a first third-party SDK;
  store the plurality of third-party SDKs;
  receive, from an application developer machine, an installation request for the first third-party SDK;
  send, in response to the installation request, the first third-party SDK for installation in an application under development; and
  send, in response to sending the first third-party SDK, a notification to a third-party service provider that published the first third party SDK, the notification identifying an integrated development environment (IDE) executing on the application developer machine and at least one third-party SDK already installed in the application under development.

15. The computer-readable storage medium of claim 14, further storing instructions that, when executed by the at least one processor, cause the at least one processor to:
  receive the application comprising the first third-party SDK; and
  distribute the application to a plurality of mobile devices for execution on the plurality of mobile devices.

16. The computer-readable storage medium of claim 14, further storing instructions that, when executed by the at least one processor, cause the at least one processor to:
  obtain a plurality of metrics for the first third-party SDK;
  receive a plurality of feedback messages for the first third-party SDK from a plurality of application developers;
  generate a profile for the first third-party SDK based on at least one parameter selected from a group of parameters consisting of one or more of the plurality of metrics and one or more of the plurality of feedback messages; and
  receive a request to view the profile.

17. The computer-readable storage medium of claim 14, further storing instructions that, when executed by the at least one processor, cause the at least one processor to:
  receive, after the application comprising the first third-party SDK is deployed on a plurality of mobile devices, a plurality of metrics from a third-party service provider that published the first third-party SDK, wherein the metrics are based on records maintained by the first third-party service provider regarding at least one parameter selected from a group of parameters consisting of the application and the end users of the application;
  generate a profile for the application based on the plurality of metrics; and
  receive a request to view the profile from a developer of the application.

18. The computer-readable storage medium of claim 14, further storing instructions that, when executed by the at least one processor, cause the at least one processor to:
  receive, from the application developer machine, a recommendation request comprising a target operating system of the application and an SDK type; and
  send, to the application developer machine, a recommendation based on the target operation system and the SDK type, the recommendation identifying the first third-party SDK.

19. A computer-readable storage medium storing instructions that, when executed by at least one processor in a software development and distribution platform (SDDP), cause the at least one processor to:
  receive a plurality of third-party software development kits (SDKs), each third-party SDK published by a third-party service provider, the plurality of third-party SDKs including a first third-party SDK;
  store the plurality of third-party SDKs;
  receive, from an application developer machine, an installation request for the first third-party SDK;
  send, in response to the installation request, the first third-party SDK for installation in an application under development;
  obtain a plurality of metrics for a previous version of the application executing on a plurality of mobile devices;
  send the plurality of metrics to publishers of monetizing SDKs, including the publisher of the first third-party SDK;
  receive, from each of the publishers of the monetizing SDKs, an estimated revenue stream for the respective publisher's monetizing SDK if installed in the previous version of the application;
  analyze the estimated revenue streams in the SDDP; and
  recommend the first third-party SDK as a recommended SDK based on the analysis of the estimated revenue streams.

* * * * *